Dec. 1, 1959         J. A. WESTPHAL        2,914,854
APPARATUS FOR PLATTING MIGRATED GEOLOGIC CROSS-SECTIONS
Filed June 20, 1956                                     3 Sheets-Sheet 1
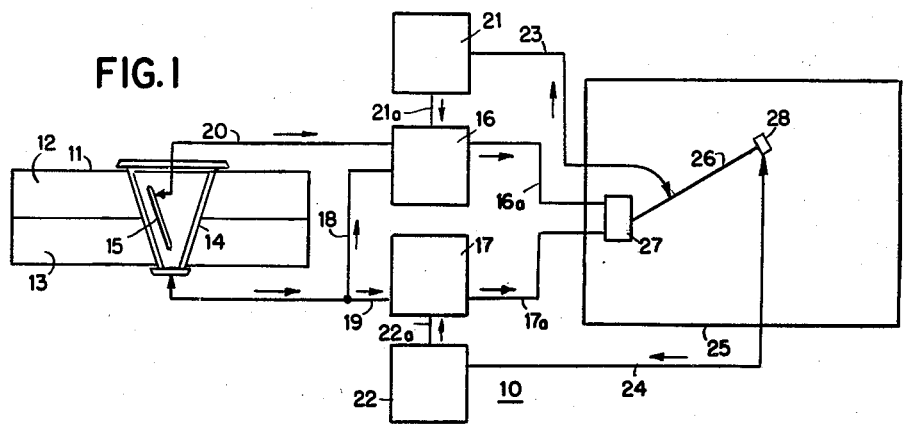
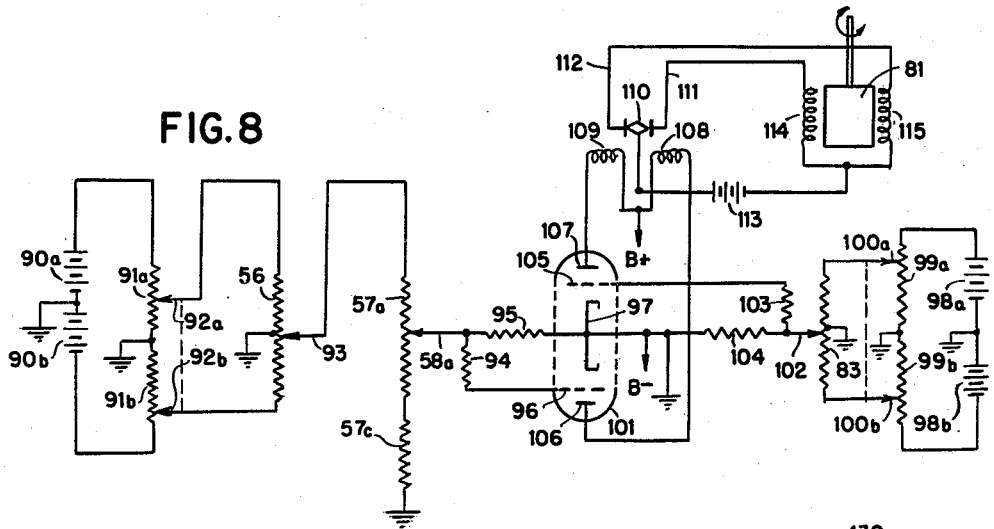
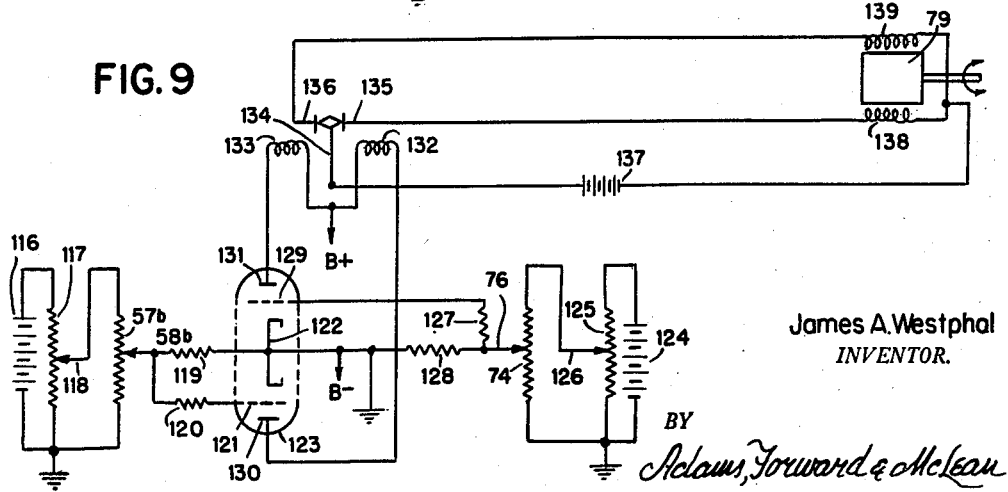
James A. Westphal
INVENTOR.
BY
Adams, Forward & McLean
ATTORNEYS Dec. 1, 1959    J. A. WESTPHAL    2,914,854
APPARATUS FOR PLATTING MIGRATED GEOLOGIC CROSS-SECTIONS
Filed June 20, 1956    3 Sheets-Sheet 2

James A. Westphal
INVENTOR.

BY
Adams, Forward & McLean
ATTORNEYS

Dec. 1, 1959  J. A. WESTPHAL  2,914,854
APPARATUS FOR PLATTING MIGRATED GEOLOGIC CROSS-SECTIONS
Filed June 20, 1956  3 Sheets-Sheet 3
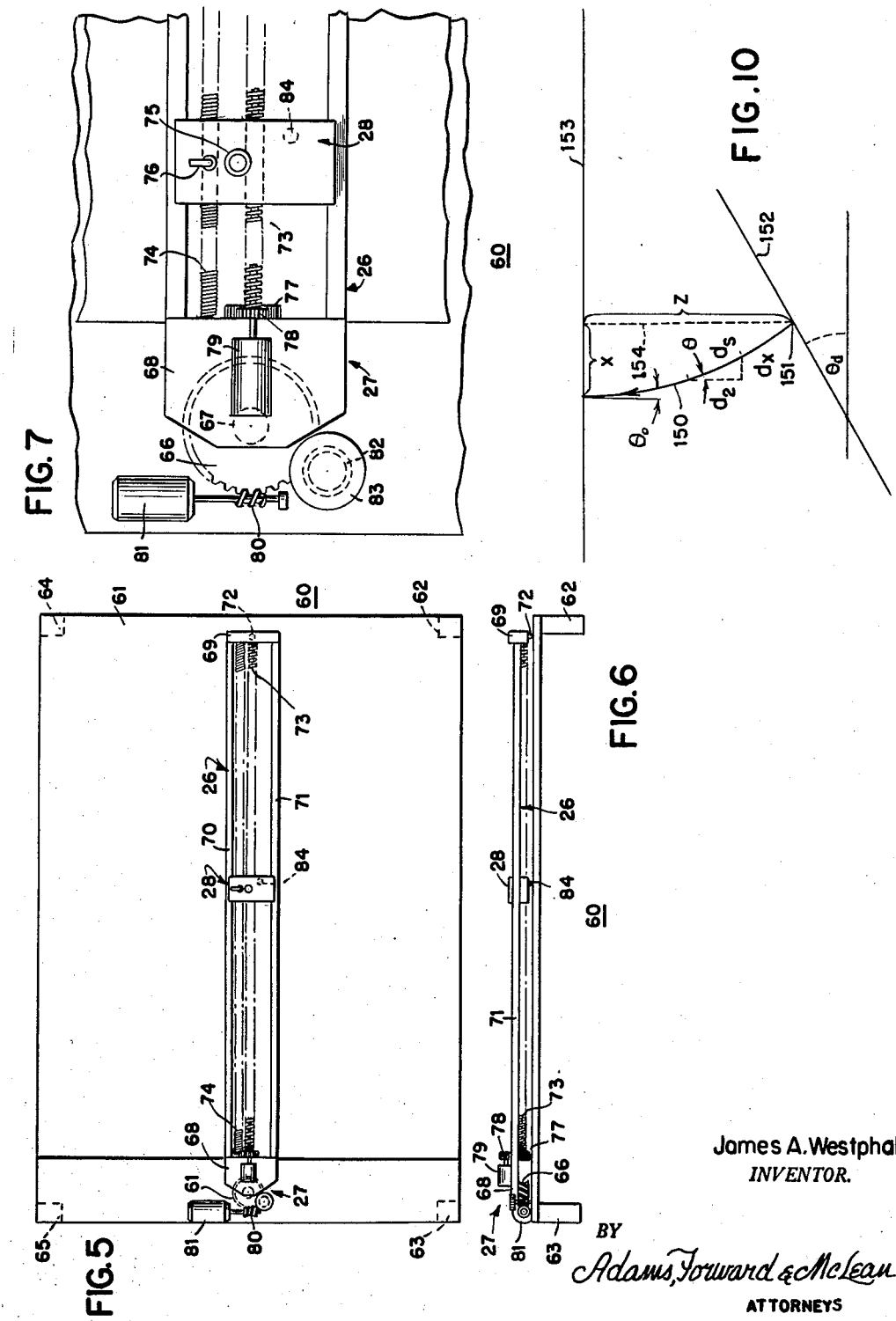
James A. Westphal
INVENTOR.

United States Patent Office 2,914,854
Patented Dec. 1, 1959

2,914,854

APPARATUS FOR PLATTING MIGRATED GEOLOGIC CROSS-SECTIONS

James A. Westphal, Tulsa, Okla., assignor to Sinclair Oil & Gas Company, Tulsa, Okla., a corporation of Maine Application June 20, 1956, Serial No. 592,615

2 Claims. (Cl. 33—1)

My invention relates to reflection seismography and in particular provides an apparatus for producing geologic cross-sections from partially interpreted reflection seismograms of the same seismic disturbance taken at different geographic locations as customarily produced, for example, in geophysical exploration.

As is well known, seismic energy propagated at or near the earth's surface is in part reflected by interfaces between sub-strata and the reflected energy can be detected, for example, by geophones located at the surface. The difference between arrival times of the same reflected energy at two geographically separated detector locations, customarily expressed by the notation "$\Delta t$," is diagnostic of the angular configuration of the interface producing the reflection, and the arrival time, that is the time elapsed between propagation of the particular seismic wave and detection of its reflection, is diagnostic of the length of the wave travel path. Both the arrival time and the difference in arrival times are functions of the velocity distribution for such seismic waves within the earth. In most petroliferous areas the velocity distribution is a roughly linear function of depth and can at most locations be approximated by a function of the general form $$V = V_0 + aZ$$

where:

$V$—is the velocity at some depth $Z$
$V_0$—is the velocity at an initial point or datum
$a$—is an arbitrary constant Such a velocity function gives rise to wave fronts which are circular and to ray paths which, since they must necessarily be normal to the wave fronts at all points, are also circular. The qualitative and quantitative aspects of such a velocity function are well known and may be found in the literature, i.e.: Mansfield: Geophysics, XII, 4, 557; Van Melle: Geophysics, XIII, 2, 158; Agocs: Geophysics, XV, 2, 227; Slotnick, Brooks, Redding: Geophysics, XV, 4, 663; Kaufman: Geophysics, XVIII, 2, 289; and others.

Unfortunately routine field procedures, with manual computing, are not well suited for handling interpretation of such a velocity distribution. Graphs, charts and slide rules have been devised to facilitate these manual processes but have not seen widespread use.

It is a particular object of my invention to provide a device for producing semi-final field data from interlocking reflection seismograms which have had only a minimum of manual processing, limited to computation of weathering and elevation corrections and indication of continuity of individual reflections along a profile of records.

It is a further object of my invention to produce a device for comparing interlocking seismograms along a surface profile and from which a geologic cross-section is prepared.

A further object of my invention is to provide a device for producing "migrated" geologic cross-sections in which the reflection interface positions are accurately shown in both a depth dimension and a horizontal dimension on said cross-section.

For a more complete understanding of the application of the principles of my invention to the construction of a practical device for plotting geologic cross-sections from interlocking seismograms reference is made to the appended drawings in which:

Figure 1 is a diagrammatic representation of a device embodying the principles of my invention;

Figure 5 is a plan view of another portion of the device shown in Figure 1;

Figure 6 is a side elevation of the portion of the device shown in Figure 5;

Figure 7 is an enlarged fragmentary plan view of a portion of the part shown in Figure 5;

Figure 8 is a schematic diagram of an electrical circuit diagrammatically represented in Figure 1;

Figure 9 is a schematic diagram of another electric circuit employed in the device shown in Figure 1; and Figure 10 is a diagrammatic representation of the location of a migrated reflection point.

Figure 2:
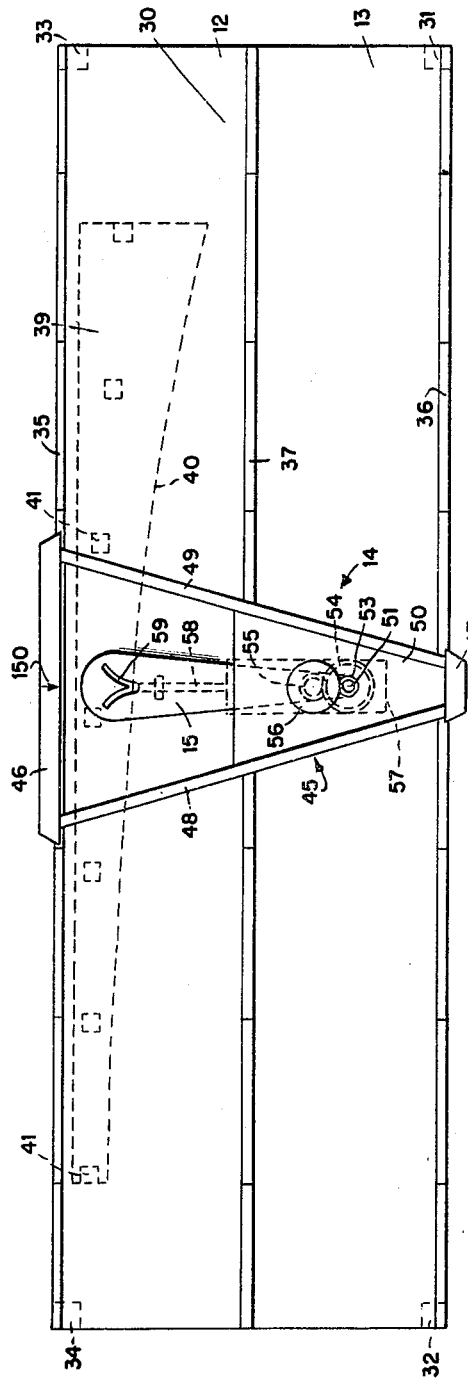
Figure 2 is a plan view of a portion of the device diagrammatically represented in Figure 1.

Referring to Figure 1, the reference numeral 10 designates the computing device of my invention. Computor 10 includes a base or table 11 having a flat upper surface which is divided longitudinally to form a pair of parallel ways 12 and 13 for receiving a pair of seismograms. A sensing device 14 for comparing common reflections appearing in both seismograms, is mounted transversely of ways 12 and 13 for longitudinal movement above the surface of table 11 and is provided with a sensing element 15 mounted for rotational movement with respect to the surface of table 11. The longitudinal position of sensing device 14 provides an indication of arrival time and the relative rotational position of sensing element 15 provides an indication of the difference in arrival times.

The longitudinal position of device 14 is employed to develop an electrical voltage or current output having corrections for weathering, elevation, lag and the like which is transmitted to a mixer 16 and a mixer 17 as indicated by the diagrammatic lines 18 and 19, respectively. The indication on sensing element 15 of its relative angular position is also employed to develop an electrical voltage or current output which is transmitted as indicated by line 20 to mixer 16.

The reference numeral 25 indicates a second base or table having a flat surface for receiving paper or similar materials on which a geologic cross-section is to be plotted. Table 25 is provided with a plotting arm 26 pivotally mounted to a driving device 27 for operating arm 26 through relative rotational positions above table 25 and about its pivotal connection to driving device 27 and for driving a plotting head 28 mounted on arm 26 lengthwise of arm 26.

Driving device 27 is operated by servo mechanisms controlled by scanners 21 and 22 which are fed, respectively, information as to the angular position of arm 26 via line 23 and information as to the longitudinal position of head 28 via line 24. Scanners 21 and 22 each develop an electrical output which is a function of the information so transmitted and in turn transmits such electrical output to mixer 16 or 17, respectively, via line 21a or line 22a as the case may be. Mixer 16 develops an output signal from the signals transmitted to it which directs via line 16a the angular position of arm 26. Similarly, the signals transmitted to mixer 17 develop an output signal which through line 17a directs the relative longitudinal position of head 28 on arm 26.

Figure 3:
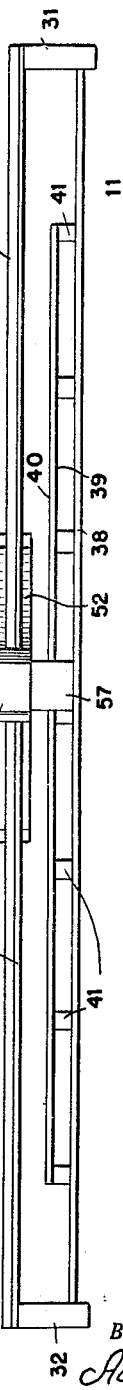
Figure 3 is a side elevation of the portion of the device shown in Figure 2.
Figure 4:
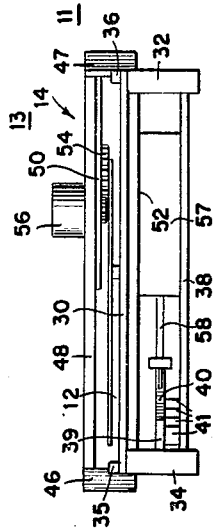
Figure 4 is an end view of the part shown in Figures 2 and 3.

Referring to Figures 2, 3 and 4, the construction of table 11 and of sensing device 14 are more completely illustrated. It will be observed that table 11 is constructed of a horizontal flat board 30 which is supported at its corner by upright legs 31, 32, 33 and 34. A pair of battens 35 and 36 are mounted on top of board 30 along its opposite longitudinal edges. Battens 35 and 36 serve as rails upon which sensing device 14 is moved, as will be later described, and are calibrated with suitable indicia lengthwise for indicating time and for permitting adjustment of seismograms for difference in seismogram time scale variations and the like. A third batten 37 is mounted on the upper surface of board 30 and divides that surface lengthwise between battens 35 and 36 to form parallel ways 12 and 13. Batten 37 is marked with suitable indicia similarly to battens 35 and 36 for indication of time.

Beneath board 30, between legs 31, 32, 33 and 34, there is mounted a second horizontal board 38. Along one edge of table 11, beneath way 12, there is mounted on board 38 a third horizontal board 39 which has a cam edge 40 cut as a function of time, as will be more fully described hereafter, and which is supported by uprights 41 above board 38 with cam 40 extending approximately lengthwise of table 11.

Still referring to Figures 2, 3 and 4, it will be observed that sensing device 14 includes a carriage 45, including a relatively elongated guide 46 resting horizontally on batten 35, a relatively short guide 47 resting horizontally on batten 36 and a pair of cross beams 48 and 49 extending above table 11 affixed to corresponding ends of guides 46 and 47, holding guides 46 and 47 in fixed relative position. Guides 46 and 47 thus can slide lengthwise of table 11 on battens 35 and 36 which function as guide rails for guides 46 and 47.

A trapezoidal plate 50 is mounted between cross beams 48 and 49 above way 13. A second trapezoidal plate 52 is mounted between guides 46 and 47 beneath board 30 but above boards 38 and cam 39. Sensing arm 15 is pivotally mounted to the undersurface of plate 50 on a shaft 53 having a central bore 51. Also mounted on shaft 53 is a spur gear 54 which is affixed to shaft 53 and rotates with arm 15. Gear 54 meshes with a pinion gear 55 projecting beneath the undersurface of plate 50 above way 13 which is mounted on the rotary control shaft of a potentiometer 56 positioned above plate 50. It is thus apparent that relative rotational movement of sensing arm 15 with respect to carriage 45 produces a movement of the wiper in potentiometer 56 which controls the effective resistance of the potentiometer.

Plate 52 carries beneath it a dual potentiometer 57 of the linear type having a reciprocable control arm 58 which is movable with respect to potentiometer 57 in a horizontal line with its end spring biased in contact with cam profile 40 of board 39. It will be observed that carriage 45 is movable longitudinally the length of table 11. At the same time such longitudinal movement is accompanied by reciprocation of element 58 of potentiometer 57 in accordance with the profile of cam 40. It will also be apparent that sensing arm 15 is movable rotatively with respect to carriage 45 and that corresponding "picks" on a pair of seismograms laid in ways 12 and 13 can be compared by aligning through bore 51, the position of a pick on the seismogram in way 13 and aligning a pick on a seismogram in way 12 in a slot 59 in arm 15. The precise manner of accomplishing the comparison will be described hereinafter and needs no further explanation now.

Referring to Figures 5, 6 and 7, there is shown a table 60 for reproducing seismic cross-sections on the basis of the information developed by sensing arm 15 on table 11. Table 60 is constructed of a flat board 61 having four upright supporting legs 62, 63, 64 and 65. Near the left edge of board 61, a bevel gear 66 and plotting arm 26 are mounted on a vertical shaft 67 supported by table 60. The inner end of arm 26 is in the form of a solid block 68 in which shaft 67 is affixed. The outer end of arm 26 is also a block 69, and blocks 68 and 69 are held in rigid relative position by a pair of horizontal slide rods 70 and 71. The undersurface of block 69 is provided with a roller bearing 72 for traversing the surface of board 61.

Between rods 70 and 71 there extends a worm 73 which is affixed at its end in blocks 68 and 69 for rotational movement about its axis. Also between blocks 68 and 69 and between side rods 70 and 71 extends a linear potentiometer 74. Plotting head 28 is a slide block having a centrally located vertical aperture 75 and is supported between rods 70 and 71 for sliding contact therebetween. Head 28 threadedly engages worm 73 such that rotation of worm 73 can cause head 28 to move between blocks 68 and 69. Plotting head 28 is also provided with a roller wiping contact 76 which slides on potentiometer rod 74. A bevel gear 77 is affixed at the end of worm 73 adjacent to block 68 and is driven by a second bevel gear 78 which is mounted on the end of the output shaft of a small permanent magnet D.C. motor 79 mounted on block 68. Helical gear 66 meshes with a worm gear 80 affixed on the output shaft of a second small permanent magnet D.C. motor 81 mounted on the upper surface of board 61. Helical gear 66 also drives a bevel gear 82 affixed on the rotary control shaft of a potentiometer 83 mounted on board 61. The undersurface of plotting head 28 is also provided with a smaller roller 84 which rides upon the surface 61 of table 60.

Figure 8 shows the electrical circuit including mixer 16 and scanner 21 which drives plotting arm 26 through relative rotational movement. In the circuit shown in Figure 8 a stable positive voltage drawn from battery 90a is tapped by wiping contact arm 92a of potentiometer 91a. The output from arm 92a is in turn fed to one end of rotary potentiometer 56 mounted above carriage 45. Similarly a stable negative voltage drawn from battery 90b, connected in series with battery 90a, is tapped by wiping contact arm 92b of potentiometer 91b which is connected in series with potentiometer 91a. Arms 92a and 92b are ganged on a common control shaft. The output from arm 92b is fed to the other end of rotary potentiometer 56 which is provided with a grounded center tap. The wiping contact 93 of potentiometer 56, which it will be noted is moved by relative rotational position of sensing arm 15 to produce a negative output if arm 15 is moved counter clockwise from the vertical (see Figure 2) and a positive output if arm 15 is moved clockwise from the vertical, delivers its output voltage through one section 57a of dual linear potentiometer 57 mounted on carriage 45 and through a fixed resistor 57c to ground. Wiping contact 58a of potentiometer 57a it will be noted is operated by plunger 58. Wiping contact 58a delivers an output voltage from potentiometer section 57a and resistor 57c to resistors 94 and 95 which are connected in series between one grid 96 and the dual cathode 97 of a dual triode vacuum tube 101.

A third battery 98a has its stable positive output voltage fed through a potentiometer 99a, the wiping contact 100a of which is connected to deliver an output voltage to one end of rotary potentiometer 83 (scanner 21) mounted on plotting board 60. Similarly, a fourth battery 98b, connected in series with battery 98a, has its stable negative output fed through a potentiometer 99b, connected in series with potentiometer 99a. The wiping contact 100b of potentiometer 99b, which is ganged with contact 100a, is connected to the other end of potentiometer 83. Potentiometer 83 is provided with a grounded center tap, thus the output from wiping contact 102 of potentiometer 83, which is delivered to resistors 103 and 104 connected in series between the second grid 105 and dual cathode 97 of dual triode 101, is positive or negative depending upon whether plotting arm 26 is above or below horizontal. The plates 106 and 107 of triode 101 are respectively connected through differential relay coils 108 and 109 to a source of high D.C. voltage indicated at B+, the negative side of which is connected to dual cathode 97 as indicated as B—. Relay coils 108 and 109 actuate a moving pole piece 110 to make contact with either contact 111 or contact 112, depending upon which half of dual triode 101 has the greater plate current. Contact 111 and pole 110 are connected through a source of low D.C. voltage 113 through armature winding 114 of motor 81. Similarly, pole 110 and contact 112 are connected across the same source of low voltage 113 through armature winding 115 of motor 81. Winding 114 when energized causes rotation of motor 81, the reverse of that produced by energizing winding 115.

It will be apparent that the circuit operates such that, in the event the voltages tapped by contacts 58a and 102 are out of balance, tube 101 (which functions as mixer 16) actuates pole 110 to energize armature winding 114 or 115, thereby driving motor 81 in one direction or the other. The connection is such that motor 81 drives gear 80 and gear 66 to rotate plotting arm 26 and at the same time to move potentiometer 83 until the setting of potentiometer 83 restores balance in the circuit. If either potentiometer 56 or 57a is subsequently disturbed by movement of sensing arm 15 or of carriage 45 the consequent lack of balance in tube 101 is automatically corrected by movement of plotting arm 26 to restore the balance, thus the circuits shown in Figure 8 operate as a servo mechanism causing the angular position of plotting arm 26 to be a function of the angular position of sensing arm 15 and of the longitudinal position of carriage 45 on table 11.

Figure 9 shows a similar electrical circuit including mixer 17 and scanner 22 which drives plotting head 28 on arm 26. In this circuit a stable positive voltage produced by a battery 116 is connected across a potentiometer 117 which has a wiping contact 118. The output of wiping contact 118 is delivered to potentiometer section 57b. Wiping contact 58b, which like contact 58a is moved by plunger 58, delivers an output voltage to resistors 119 and 120 and thence to one grid 121 and the dual cathode 122 of a dual triode vacuum tube 123 (which functions as mixer 17).

A stable positive voltage produced by a battery 124 is fed through a potentiometer 125 which is provided with a wiping contact 126, the output of which is fed through linear potentiometer 74 (scanner 22) mounted on plotting arm 26. Moving tap 76, slidable along the length of potentiometer 74, produces an output voltage which is fed to resistors 127 and 128 and thence to the second grid 129 and dual cathode 122 of dual triode 123. The plates 130 and 131 of triodes 123 are connected respectively through coils 132 and 133 of a differential relay to a source of high voltage, indicated as B+, the negative side of which, indicated as B—, is connected to dual cathode 122. Coils 132 and 133 operate a moving pole 134 which makes contact between a contact 135 and a contact 136, depending upon which half of tube 123 has the greater plate current. Contact 135 and pole 134 make a circuit through a source of low voltage 137 through an armature winding 138 on motor 79. Similarly contact 136 and pole 134 make a circuit through battery 137 and armature winding 139 of motor 79. Windings 138 and 139 are disposed such that their respective energizations in the circuit of Figure 9 produce reverse operation of motor 79.

The operation of the circuit shown in Figure 9 is essentially the same as that of the circuits shown in Figure 8 in that if the tube 123 is out of balance the tube conducts a greater plate current through one-half or the other to operate either coil 138 or 139 to drive motor 79, thus rotating worm 73 and moving plotting head 78 to a position in which the contact 76 is moved along potentiometer 74 until balance in the circuit is restored. Every change in position of carriage 45 along the length of table 11 thus causes a movement of plotting head 28 along plotting arm 26 related to the movement of carriage 45.

Returning to the theory of operation for the moment reference is made particularly to Figure 10 in which a ray 150 is shown reflected from a point 151 located on the surface 152 of a substratum. In Figure 10 the reference numeral 153 indicates a datum line on which all calculations of depth are based and the reference numeral 154 denotes the vertical line extending through point 151. As noted above, the arrival time is based on a uniform function of depth and thus can be used to indicate the depth of the substratum producing the reflection, provided that some correction is made for the velocity distribution. The same velocity distribution of course is also involved in any calculation of horizontal displacement or the like based upon the difference in arrival times. The arrangement described above is provided with electrical conversion of these values such that polar coordinates of the position of plotting head 28 are obtained.

Let:

$\theta$—be the instantaneous angle the ray path 150 makes with the vertical $\theta_0$—be the angle of emergence of ray 150 at datum line 153

$\theta_d$—be the angle of dip of reflecting bed 152

$Z$—be the depth below datum 153

$V$—be the velocity function $V = V_0 + aZ$ $V_0$—be the velocity of ray 150 at datum 153

$T_R$—be the travel time (two way) of ray 150

$t_R$—be the travel time (one way) of ray 150

$\Delta t$—be the step out time for adjacent records $X$—be the horizontal displacement of the migrated depth point $X_s$—be the distance between adjacent shot locations from which $\Delta t$ is measured $K$—be some constant From measured or assumed data we know:

$T_R$, $\Delta t$, $a$ and $V_0$

The polar coordinates of these parameters can be developed as follows:

It can be shown that:

$$\frac{\sin \theta_0}{V_0} = \frac{\sin \theta}{V} = K \text{ by Snell's law} \qquad (1)$$

$$t_r = \int_0^{t_R} dt = \int_0^s \frac{ds}{V} = \int_0^Z \frac{dz \sec \theta}{V}$$

$$= \int_{V_0}^V \frac{dv}{av} \sec \theta = \int_{\theta_0}^{\theta_d} \frac{d\theta}{a \sin \theta} = \frac{1}{a} \log \frac{\tan \theta_{d/2}}{\tan \theta_{0/2}} \qquad (2)$$

$$X = \int d_x = \int dz \tan \theta = \int_{\theta_0}^{\theta_d} \frac{\sin \theta_d \theta}{ak} = \frac{-V_0 (\cos \theta_d - \cos \theta_0)}{a \sin \theta_0} \qquad (3)$$

$$Z = \int d_z = \int_{\theta_0}^{\theta_d} \frac{\cos \theta_d \theta}{ak} = \frac{V_0}{a \sin \theta_0} (\sin \theta_d - \sin \theta_0) \qquad (4)$$

It may be shown that the polar coordinates are:

$$R = \sqrt{X^2 + Z^2} = \left(\frac{2V_0}{a \sin \theta_0}\right)\left(\sin \frac{\theta_d - \theta_0}{2}\right) \qquad (5)$$

$$\varphi = \frac{\theta_d + \theta_0}{2} \qquad (6)$$

and that $$\tan \frac{\theta_d}{2} = \tan \frac{\theta_0}{2} (e^{at_R}) \qquad (7)$$

Equations 5, 6 and 7 are exact but inconvenient for mechanization.

Equation 5 may be shown (by trigonometric manipulation) to be also $$R = \frac{V_0}{a}(1 - e^{-at_R}) \frac{\sin\theta_{a/2}}{\sin\theta_{0/2}} \text{ or } R = \frac{V_0}{a}(e^{at_R} - 1) \frac{\cos\theta_{d/2}}{\cos\theta_{0/2}} \quad (8)$$

which may be shown to be approximately $$R \approx \frac{V_0}{a}(e^{at_R} - 1) \quad (9)$$

substituting $T_R/2$ for $t_R$ $$R \approx \frac{V_0}{a}(e^{\frac{at_R}{2}} - 1) \quad (10)$$

and in equation 6 since $$e^{aT_R/2}\left(\frac{\theta_0}{2}\right) = \frac{\theta_d}{2}$$

$$\varphi \approx \frac{\theta_0}{2}(e^{aT_R/2} + 1) \quad (11)$$

Equations 10 and 11 have an accuracy well within the limit of error inherent in the data and velocity assumptions.

In constructing the computer described with reference to the drawings the output of potentiometer 57a and the output of potentiometer 57b are made a function of $$e^{\frac{aT_R}{2}}$$

by constituting the profile 40 of cam 39 with such function where the calibrations on battens 35, 36 and 37 are calibrated as if in $T_R$. Potentiometer 91 has its tap 92 set such that the output voltage is proportional to $$\frac{V_0}{2x_s}$$

Since the resistance of potentiometer 56 is a function of $\Delta t$ the voltage fed to potentiometer 57a is proportional to $$\frac{V_0}{2X_s}\Delta t \text{ or } \frac{\theta_0}{2}$$

The resistance of fixed resistor 57c is proportional to the value two. Consequently, since the position of tap 58a on potentiometer 57a is determined as a function of $$e^{\frac{aT_R}{2}}$$

the voltage output developed at tap 58a and fed to tube 101 is proportional to $$\theta_0\left(e^{\frac{aT_R}{2}} + 1\right)$$

because when the resistance of resistor 57a is tapped at zero, i.e., $T_R = 0$, the value of $$e^{\frac{aT_R}{2}} + 1$$

is two. Hence the output at tap 58 is proportional to the angle at which the plotting arm must be set to indicate the location of the reflecting point (see Equation 11).

The position of tap 118 on potentiometer 117 is similarly arranged to produce a voltage proportional to $$\frac{V_0}{a}$$

Thus, since tap 58b is positioned as a function of $$e^{\frac{aT_R}{2}}$$

the output voltage measured by tap 58b is indicative of the coordinate R for plotting head 28 because when tap 58b is at zero, i.e., $T_R = 0$, $$e^{\frac{aT_R}{2}} - 1$$

is zero.

In operation a pair of seismograms are placed on table 11, one seismogram being located lengthwise along way 12 and the other being similarly oriented along way 13. The left ends of each of the interlocking seismograms are adjusted to correct for weathering, elevation, lag and the like in accordance with the indicia marked on battens 35, 36 and 37.

Prior to picking any reflections it is first necessary to adjust the positon of potentiometer tap 92 on potentiometer 91 to assure that the voltage output is equal to the $$\frac{V_0}{2X_s}$$

These values, of course, can be readily calculated with knowledge of the location and the position of the particular seismic propagation and detection points. Potentiometer 91 can suitably be calibrated in terms of $$\frac{V_0}{2X_s}$$

such that manual adjustment is readily facilitated. Sensing device 14 is moved to the zero index of table 11. Sensing element 15 is operated perpendicular to the length of table 11. The servo system is then allowed to stabilize and the paper of the geologic cross-section is adjusted on table 25 to have its zero datum directly below vertical aperture 75.

Sensing device 14 is then operated to an arrival time corresponding to the maximum of the geologic cross-section.

The tap 118 on potentiometer 117 is adjusted to provide an output which is proportional to $$\frac{V_0}{a}$$

Again, the data are known and the value can be calculated. Suitably, potentiometer 117 is therefore calibrated in terms of this dividend, such that manual adjustment is facilitated. Wiping contact 126 is then adjusted to bring aperture 75 vertically over the maximum depth datum on the geologic cross-section paper on table 25. Computation of the reflection time from the maximum scale depth of the cross-section can be accomplished by using approximation 9 above. A pair of reflections with an average $\Delta t$ for the area are selected on the seismograms and the sensing device 14 and element 15 adjusted in the manner described hereinafter. A computation of the position of the depth point is then made using formulas 9 and 11. Potentiometer 99 is then adjusted to position vertical aperture 75 directly over the plotted depth point.

After thus initially setting the position of the various controls, carriage 45 is moved toward the right until the first pick on the lower seismogram appears in aperture 51. Arm 53 is then moved as indicated above to locate the corresponding pick in the upper seismogram.

It will be observed that slot 59 is in reality a pair of curved slots intersecting at approximately the location of the base line of the seismogram in way 12 when arm 15 is in vertical position. Arm 15 necessarily swings an arc about its axis in locating picks which are displaced in time from picks on the seismogram in way 13. The value of $\Delta t$ is measured along the base line, but it is desirable to measure the value as a linear function of angular displacement rather than as a trigonometric function of angular displacement. Consequently, the variation in arc length from the corresponding tangential length, which variation is a curve, is used to locate and describe the curves forming slot 59, such that $\Delta t$ is measured as a linear function of the angular displacement of arm 15. When the pick on the upper seismogram, as seen in Figure 1, is located to the left of the pick in the lower seismogram, proper correction for the variation in angular displacement is provided by locating the upper pick on the right portion of curved slot 59. Similarly, when the pick is located to the right of the perpendicular line the left hand portion of slot 59 is employed to locate the pick at its intersection with the base line.

The movement of carriage 45 and the movement of arm 15 to a reflection pick position produce movement of plotting head 28 along plotting arm 26, and an angular displacement of plotting arm 26 through the operation of the servo mechanisms shown in Figures 8 and 9. When this movement has ceased and the system is in balance a pencil mark is made on paper located on table 25 through the aperture 75 on plotting head 28. The point thus marked represents the reflection point producing the reflections located by sensing arm 15 and indicates both the depth and migration from the vertical. The operation is then repeated reflection by reflection along the seismograms. It is evident that ultimately what is achieved is a cross-section on the paper located on table 25 indicating the location of various substrata with reference to a datum line and datum point. Thus through the operation of the device described above seismograms can be used directly to plot geologic cross-sections by simple manual manipulation of a sensing arm and indication on the paper of the resulting location of the aperture 75 on head 28. Through repetition involving other seismograms additional points can be made, and, eventually sufficient points can be located to identify an entire cross-section throughout a plane or other cross-section.

I claim:

1. An apparatus for obtaining graphic analysis of seismic data which comprises a base including a pair of ways disposed parallel to each other in a plane, a carriage mounted on said base and movable relative thereto lengthwise of said ways, a sensing arm mounted on said carriage for rotational movement relative thereto above said ways, first means operatively connected to said sensing arm having an electrical output responsive to the angular position of said arm relative to said carriage, second means including a cam control proportional to $$e^{\frac{aT_R}{2}}$$

where:

$e$ is the natural logarithm base,
$a$ is the constant of the seismic velocity function, and
$T_R$ represents the arrival time (two way) of a normally reflected seismic event in a medium whose seismic velocity is a linear function of depth, said second means being operatively connected to said carriage to have an electrical output response to the position of said carriage relative to the length of said ways as if said length were calibrated in $T_R$, plotting means for plotting a geologic cross-section, and servo means for driving said plotting means responsive to the electrical outputs of said first and second means.

2. An apparatus according to claim 1 in which said plotting means includes a plotting base for receiving sheet material, a plotting arm pivotally mounted above said plotting base, a plotting head slidably mounted on said plotting arm, a first servo mechanism responsive to the electrical output of said first and second means for driving said plotting arm about the pivotal connection thereof to said plotting base, and a second servo mechanism responsive to the electrical output of said second means for driving said plotting head on said plotting arm.

References Cited in the file of this patent

UNITED STATES PATENTS

| | | |
|---|---|---|
| 2,243,730 | Ellis | May 27, 1941 |
| 2,569,817 | Wolf | Oct. 2, 1951 |
| 2,612,627 | Straney | Sept. 30, 1952 |
| 2,654,064 | Broding | Sept. 29, 1953 |
| 2,686,633 | Hale | Aug. 17, 1954 |
| 2,712,694 | Herbold | July 12, 1955 |
| 2,717,979 | Gardiner | Sept. 13, 1955 |

UNITED STATES PATENT OFFICE
Certificate of Correction

Patent No. 2,914,854                                December 1, 1959

James A. Westphal

It is hereby certified that error appears in the printed specification of the above numbered patent requiring correction and that the said Letters Patent should read as corrected below.

Column 2, line 66, for "develop" read —develops—; column 6, lines 54 and 55, Equation 2, for that portion reading $$\frac{dv}{av} \quad \text{read} \quad \frac{dv}{a\overline{V}}$$

column 7, line 3, for that portion of Equation 8 reading "$\sin\theta_{a/2}$" read —$\sin\theta_{d/2}$—; line 30, for "constituting" read —constructing—; column 10, line 9, for "response" read —responsive—.

Signed and sealed this 6th day of September 1960.

[SEAL]

Attest:
ERNEST W. SWIDER,
*Attesting Officer.*

ROBERT C. WATSON,
*Commissioner of Patents.*